US005701342A

United States Patent [19]

Anderson et al.

[11] Patent Number: 5,701,342
[45] Date of Patent: Dec. 23, 1997

[54] COMPLEX DOCUMENT SECURITY

[75] Inventors: Mark Stephen Anderson; John Desborough Yesberg; Michael Pope; Lisa Nayda; Ken Hayman; Brendan Beahan, all of Salisbury, Australia

[73] Assignee: The Commonwealth of Australia of Anzac Park, Canberra, Australia

[21] Appl. No.: 481,397

[22] PCT Filed: Dec. 14, 1993

[86] PCT No.: PCT/AU93/00645

§ 371 Date: Aug. 28, 1995

§ 102(e) Date: Aug. 28, 1995

[87] PCT Pub. No.: WO94/14259

PCT Pub. Date: Jun. 23, 1994

[30] Foreign Application Priority Data

Dec. 14, 1992 [AU] Australia ............... PL6312

[51] Int. Cl.$^6$ .................................................. H04L 9/32
[52] U.S. Cl. ............................................. 380/4; 380/23
[58] Field of Search ................................. 380/1, 4, 23, 49

[56] References Cited

U.S. PATENT DOCUMENTS

| 5,204,961 | 4/1993 | Barlow .................... | 380/4 X |
| 5,258,998 | 11/1993 | Koide ..................... | 375/7 |
| 5,278,901 | 1/1994 | Shieh et al. .............. | 380/4 |
| 5,557,722 | 9/1996 | De Rose et al. ........... | 395/148 |

FOREIGN PATENT DOCUMENTS

| 590228 | 6/1986 | Australia ............... | G06F 7/00 |
| 0297146 | 4/1990 | Japan .................. | H04L 9/00 |

OTHER PUBLICATIONS

O'Brien et al: Richard O'Brien and Clyde Rogers "Developing Applications on LOCK" Proceedings of the 14$^{th}$ National Computer Security Conference, Washington, D.C., October 1991, pp. 147–156.

Saydjari et al: O. Sami Saydjari, Joseph M. Beckman, and Jeffrey R. Leaman, "LOCK Trek: Navigating Uncharted Space" Proceedings of the IEEE Symposium on Security and Privacy, Oakland, CA, May 1989, pp. 167–175.

*Primary Examiner*—Gilberto Barron, Jr.
*Attorney, Agent, or Firm*—Baker, Maxham, Jester & Meador

[57] ABSTRACT

A method and means to control the degree to which the presence of covert information may be reduced, eliminated or corrupted in documents created on a computer device (particularly complex documents) before the document is transmitted outside a secure environment in which the document is created. The process of handling a document in a secure environment comprises the preferred step of displaying the document or a predetermined portion thereof in a manner which conforms to the rule that no pixel of the display is written to more than once for the current portion of the document being displayed. Preferably the method includes the steps of creating a document, transforming the document into an intermediate form by defining the content and structure of the document using a predetermined set of document describers, applying the intermediate form of the document to at least one filter adapted to eliminate or corrupt the content and form of any covert information contained within the intermediate form of the document followed by the previously described step of displaying the document in the manner described above.

31 Claims, 3 Drawing Sheets

COMPLEX DOCUMENT SECURITY

This invention relates to the security of computer documents and in particular to complex documents, although not exclusively so, and to a means which controls the degree to which the presence of covert information may be reduced or eliminated in documents before transmission external of a secure environment.

BACKGROUND

An ideal way to ensure the security of a computer document, assuming the appropriate integrity of the author, is to have the author create the document on a trusted computer. A trusted computer is designed to prohibit the creation or existence within the document of elements which are not intended by the author to be therein. Should the document created on a trusted computer need to be transmitted externally of the secure environment occupied by the author and the trusted computer, the electronic form of the document can have appended thereto a seal which will indicate, when processed in a particular way, whether the document with which it is uniquely associated has been changed in any way. As long as the document is unaltered, it may then be communicated to its intended recipient, who may view it, on a trusted computer as the case may be.

Complex documents (i.e., documents which contain any non-textural information and/or representational structure) are typically created to communicate information in a form suited to both the writer and the recipient and typically specialised characters and layout will be necessary. Understandably, as long as there exists a likelihood that unauthorised or covert information has been secreted within the document structure and the intended information within the document, that document should not be transmitted externally of the secure environment in which it was created.

A typical example of a complex document comprises text, font selection data, pagination data, page numbering data and many other characteristics unique to the document, the word processing package used to create it and the operating system upon which the package resides. A more complicated document may further comprise purely visual and diagrammatic information (e.g., graphics and bit-map images).

At present there exist very few trusted computer devices which can be used to create documents. These typically have a very limited character set, and are not sufficiently trusted to be used in all situations. Creating a complex document on a trusted device is thus not generally feasible. This severely limits the usefulness of trusted computers in the information exchange arena.

Therefore, there exists a need to devise a method and means for the handling of documents created on untrusted computer devices (which are widely used within secure environments) such that there is an acceptably low probability that such documents, when proposed to be transmitted external of the secure environment, contain unauthorised or covert information.

BRIEF DESCRIPTION OF THE INVENTION

In a broad aspect of the invention, a method of exporting a document from a secure computer environment comprises the steps of:

(a) applying a document to at least one filter to eliminate or corrupt the content or form of any covert information contained within said document, (b) displaying said filtered document or a predetermined portion thereof in a trusted manner, and (c) if said filtered document appears to be acceptable, communicate said document, in a trusted manner, external of said secure computer environment.

In a further aspect of the invention a method of handling a document, where step (c) is replaced by the step:

(d) if said filtered document appears to be acceptable, associating with said filtered document a seal which indicates that said document can be communicated external of said secure computer environment.

In a further aspect of the invention a method of handling a document, where step (b) is replaced by the step:

(e) displaying said filtered document or a predetermined portion thereof in a trusted manner which also conforms to the rule that no pixel of the display is written to more than once for the current portion of the document being displayed.

In a further aspect of the invention a method of handling a document, comprising the steps of (a), (b), (d) where step (b) is replaced by the step:

(f) displaying said filtered document or a predetermined portion thereof in a trusted manner which also conforms to the rule that no pixel of the display is written to more than once for the current portion of the document being displayed.

In a further aspect of the invention a method of handling a document, comprising the steps of (a), (b), (c) with the following step being performed before step (b):

(g) checking said filtered document in a trusted manner to ensure only a predetermined form of said document is passed to the next step.

In a further aspect of the invention a method of handling a document, comprising the steps of (a), (b), (d) with the following step being performed before step (b):

(h) checking said filtered document in a trusted manner to ensure only a predetermined form of said document is passed to the next step.

In a further aspect of the invention a method of handling a document, comprising the steps of (a), (e), (c) with the following step being performed before step (e):

(i) checking said filtered document in a trusted manner to ensure only a predetermined form of said document is passed to the next step.

In a further aspect of the invention a method of handling a document, comprising the steps of (a), (f), (d) with the following step being performed before step (f):

(j) checking said filtered document in a trusted manner to ensure only a predetermined form of said document is passed to the next step.

In a further aspect of the invention a method of handling a document, comprising the steps of (a), (b), (c) where step (a) is replaced by the following step:

(k) applying said document to at least one trusted filter adapted to eliminate or corrupt the content and form of any covert information contained within said document.

In a further aspect of the invention a method of handling a document, comprising the steps of (a), (b), (d) where step (a) is replaced by the following step:

(l) applying said document to at least one trusted filter adapted to eliminate or corrupt the content and form of any covert information contained within said document.

In a further aspect of the invention a method of handling a document, comprising the steps of (a), (e), (c) where step (a) is replaced by the following step:

(m) applying said document to at least one trusted filter adapted to eliminate or corrupt the content and form of any covert information contained within said document.

In a further aspect of the invention a method of handling a document, comprising the steps of (a), (f), (d) where step (a) is replaced by the following step:

(n) applying said document to at least one trusted filter adapted to eliminate or corrupt the content and form of any covert information contained within said document.

In a further aspect of the invention a method of handling a document, comprising the steps of (k), (b), (c) where step (k) is performed after step (b) rather than before.

In a further aspect of the invention a method of handling a document, comprising the steps of (l), (b), (d) where step (l) is performed after step (b) rather than before.

In a further aspect of the invention a method of handling a document, comprising the steps of (m), (e), (c) where step (m) is performed after step (e) rather than before.

In a further aspect of the invention a method of handling a document, comprising the steps of (n), (f), (d) where step (n) is performed after step (f) rather than before.

In a further aspect of the invention a method of handling a document in accordance with some of the further aspects of the invention described above, and the following further steps:

(o) receiving with a trusted gateway device within said secure computer environment said document with its associated seal, (p) checking the validity of said seal with a trusted verification means, and if and only if said seal is validly associated with said document, (q) communicating said document and its associated seal external of the secure computer environment.

In a further aspect of the invention a method of handling a document in accordance with the previous aspect of the invention, with step (q) being replaced by the following step:

(r) communicating said document without its associated seal external of the secure computer environment.

In a further aspect of the invention a method of handling a document in accordance with the second previous aspect of the invention, followed by the steps:

(s) receiving said filtered document and its associated seal external of said secure computer environment, (t) disassociating said seal and extracting application specific data from the seal.

In a further aspect of the invention a method of handling a document in accordance with any previous aspect of the invention, with the addition of the following step before any other step:

(u) transforming said document into an intermediate form by defining the content and structure of said document using a predetermined set of document describers, and with all subsequent steps operating on the transformed document rather than said document.

In a further aspect of the invention a method of handling a document in accordance with some of the further aspects of the invention described above other than those described in the fourth previous aspect of the invention, with the following step being performed before any other step:

(v) transforming said document into an intermediate form by defining the content and structure of said document using a predetermined set of document describers, and with the following additional step being performed after said transformed and filtered document is received external of said secure computer environment:

(w) further transforming said transformed and filtered document in the reverse fashion to step (v) to produce a final document in a form useful to the recipients of the document.

In a further aspect of the invention a method of handling a document in accordance with any previous aspect of the invention, wherein one of said at least one filter comprises the steps of:

(x) if not already a digital image, converting said document or a portion thereof into a first digital image, (y) converting said first digital image into an analogue form, (z) further converting said analogue form into a second digital image, which comprises the filtered document or a portion thereof.

In a further aspect of the invention a method of handling a document in accordance with the previous aspect of the invention, with the step (z) being replaced by the step:

(aa) further converting said analogue form into a second digital form of equal or lesser resolution than said first digital image, said second digital image comprising the filtered document or a portion thereof.

In a further aspect of the invention a method of handling a document in accordance with any previous aspect of the invention, wherein one of said at least one trusted filter comprises the steps of:

(ab) if not already a digital image, converting said document or a portion thereof into a first digital image, (ac) converting said first digital image into an analogue form, (ad) further converting said analogue form into a second digital image, which comprises the filtered document or a portion thereof.

In a further aspect of the invention a method of handling a document in accordance with the previous aspect of the invention, with the step (ad) being replaced by the step:

(ae) further converting said analogue form into a second digital image of equal or lesser resolution than said first digital image, said second digital image comprising the filtered document or a portion thereof.

In a further aspect of the invention a method of handling a document in accordance with any previous aspect of the invention, wherein one of said at least one filter step in step (a) of claim 1 comprises the steps of:

(af) if not already a digital image, converting said document or a portion thereof into a third digital image, (ag) converting said third digital image into a fourth digital image such that one or more pixel values from said third image are combined to produce one or more pixel values in said fourth digital image wherein said fourth digital image comprises said filtered document or a portion thereof.

In a further aspect of the invention a method of handling a document in accordance with the previous aspect of the invention, with the step (ag) being replaced by the step:

(ah) converting said third digital image into a fourth digital image of equal or lesser resolution, such that one or more pixel values from said third image are combined to produce one or more pixel values in said fourth digital image, wherein said fourth digital image comprises said filtered document or a portion thereof.

In a further aspect of the invention a method of handling a document in accordance with either of the previous aspects of the invention, wherein said one or more pixel values from said third image are selected and or combined in a random or pseudo-random manner to produce one or more pixel values in said fourth digital image.

In a further aspect of the invention a method of handling a document in accordance with any previous aspect of the invention, wherein one of said at least one filter step in step (a) of claim 1 is a trusted filter step comprising the steps of:

(ai) if not already a digital image, converting said document or a portion thereof into a third digital image, (aj) converting said third digital image into a fourth digital image such that one or more pixel values from said third image are combined to produce one or more pixel values in said fourth digital image, said fourth digital image comprising said filtered document or a portion thereof.

In a further aspect of the invention a method of handling a document in accordance with the previous aspect of the invention, with the step (aj) being replaced by the step:

(ak) converting said third digital image into a fourth digital image of equal or lesser resolution such that one or more pixel values from said third image are combined to produce one or more pixel values in said fourth digital image, said fourth digital image comprises the filtered document or a portion thereof.

In a further aspect of the invention a method of handling a document in accordance with either of the previous aspects of the invention, wherein said one or more pixel values from said third image are selected and or combined in a random or pseudo-random manner to produce one or more pixel values in said fourth digital image.

These and other aspects of the invention will be apparent from the following description of preferred embodiments which, it will be understood, are illustrative only, and need not limit the invention to any one or combination of the following elements or features.

BRIEF DESCRIPTION OF THE FIGURES

In order that the invention may be more clearly understood, reference will now be made to the accompanying drawings, wherein.

DETAILED DESCRIPTION OF THE INVENTION

When a document is created and verified visually by its author it is preferable to have some means which provides an assurance that a message displayed on an untrusted computer device is the same message input to that device by the user. It is therefore imperative that the contents and/or the format of the message is not changed by the untrusted device's hardware or untrusted software and this type of security is provided, for the purposes of the present invention, by what will be referred to as a trusted path device.

As discussed previously, trusted computer devices do not currently support all the functionality of an untrusted computer device. A trusted path device can assist in overcoming this difficulty since it is located between the untrusted computer device input and its untrusted display. The trusted path device is also limited in the range of characters and formatting with which it can work but allows the user to be confident that the message input to the device is the same as the message which is displayed. Having visually verified a message or document using a trusted path device, it is of advantage to seal that same message so as to prevent any unauthorised tampering with the document. This can be achieved using a suitable message sealing and/or encryption device. In the first instance, a means to allow the message to be appended or associated with a message classification and/or a digital signature (seal) is usually part of the trusted path device, and, in the second instance, such a sealed message may or may not be encrypted with a separate encryption device and key.

There still exist, however, many circumstances where it is desirable to use variations of untrusted computer devices, trusted path devices and trusted encryption devices so that messages, of various types (e.g., plain text message and complex documents) and security classifications, can pass outside of a secure environment.

One such circumstance arises when a complex document is created on an untrusted computer device, for example a letter containing both text having a particular font, and a bit mapped image. Such a document created on an untrusted computer is not suitable for use with the previously described trusted path device, since there will always exist a likelihood that covert information will be contained within the visualised form of the document which can not be handled by the trusted path device.

Indeed, complex documents of this type are capable of having one or more covert information parts and it is the method and means of the invention which can be used to achieve the reduction or elimination of covert information within the complex document, as well as preparing the document for transmission outside of a secure environment by sealing it. Only with a valid seal will the message be allowed to pass outside the secure environment.

Figure 1:
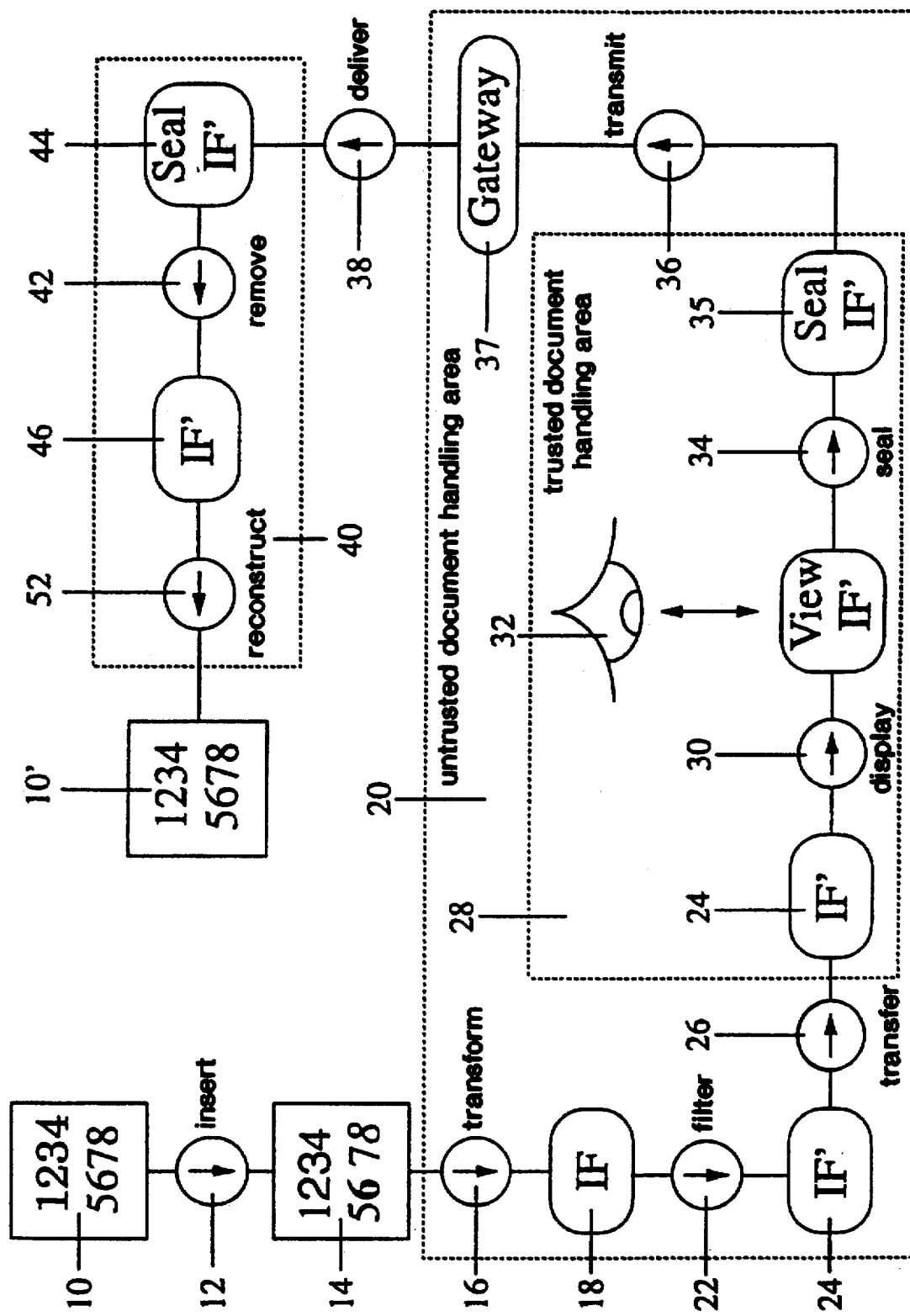
FIG. 1 depicts a schematic of the processes undertaken on a document from its source to its destination in accordance with one embodiment of the invention.

FIG. 1 depicts a schematic of the path of a document and, at various positions along the path the document is converted, filtered, viewed by the author/operator of the document, sealed and passed via a computer network to a gateway which controls the passage of the message out of the secure environment. The document is then sent to another environment, possibly also secure, to be decrypted if required, reconstructed, reconverted and displayed to its destination recipient.

One mechanism by which documents may compromise security is the concealment of more highly classified information in a document of lower classification. Concealment can occur, by way of example, by changing only some part of the pixel array of an intended image to form an image which is designed not to be apparent to the human eye but which reveals, when extracted, information classified at a higher level than the image. In an example using text, fonts can be changed in a way subtle to the eye which can conceal words, figures and symbols which may represent information classified at a higher level than the text being sent outside the secure environment. The likelihood of successful concealment increases with the increased complexity of the document.

Another means for concealment in a complex document may comprise the covert use of non-textual information which may comprise word processing control sequences which denote font changes, image characters, local dictionary words, etc. This non-textural information is usually not vital to the information within the message or document, and further includes representational structures, which comprise specific details related to the document's storage on the computer system, e.g. the names of files that are collected together to build the complete document.

As is readily apparent, complex documents must be checked for covert information and therefore require special handling if they are to be communicated outside a secure environment. The ideal way to handle this need is to create documents on a trusted computer designed for a specific type of complex document. Associating a seal with that complex document will then allow the document to be transmitted outside the secure environment.

However, as previously described there do not exist trusted computers capable of satisfying that need. The schematic of FIG. 1 depicts, as an example only, the handling of complex documents, however, it will be appreciated by the person skilled in the art that a wide range of document types could be handled with appropriate changes to the functions provided in the various means described hereafter.

An ideal document handling procedure would eliminate all covertly secreted information, however, in strictly practical terms, there will always exist a probability that not all covert information will be eliminated. Furthermore, a portion of the procedure to be described will rely solely on the trust given to the author of the document. Obviously, if the author allows classified information to be incorporated into the document to be sent external of the secure environment, that information will be transmitted externally of the secure environment regardless of the operation of the invention.

The step which relies on the operator to recognize any covert information, assuming that it has survived the covert information elimination procedures applied by a filter process to be described in functional terms later, is an important step which relies on the trustworthiness of the operator at the time the step is taken and is inherently a weak link in the security related aspects of the invention.

Whenever an untrusted computer is used to create a document 10, there will exist a risk that covert information can be inserted 12 into the document. All documents are thus of the form 14 in that they potentially have been changed to include information having a higher classification of secrecy than the document would appear to contain. The actual number of mechanisms by which covert information may be included in the document is almost infinitely large. The operations to be described herein are designed to lower the likelihood that covert information is concealed in the document before it is transmitted externally of the secure environment within which the document was created.

The first step in the document handling process, which in this example is a complex document, is to invoke a process 16 which transforms the complex document into an intermediate form (IF) 18. In this embodiment, the step is performed with untrusted software running on the untrusted computer which created the complex document. This process is performed within the source complex document handling area 20 of the secure environment. The process 16 may be implemented using trusted or untrusted software, typically untrusted in this embodiment. This untrusted software converts the complex document 14 from the specific application format created by whatever proprietary software is used e.g. Microsoft Word, to an acceptable intermediate format IF 18.

The untrusted software which transforms the complex document also determines how the original document (which may comprise a single file or a collection of files) will be handled or displayed. For example, it may handle it one page at a time, or it may handle it a portion of a page at a time, and the transformation software can accommodate one or more of these approaches as desired by the user or as predetermined by the sending system's system administrator or security officer.

The IF 18 should encapsulate, if not all, at least predetermined portions of the entire content and sometime unique structure of the document 14. An intermediate format document can still include describers for raw bit maps, document text, application specific formatting information, etc. Flexibility is provided by choosing a predetermined set of complex document describers which are capable of adequately describing complex documents having a large variety of application specific formats. Furthermore, it is preferable for the process of conversion to be platform independent.

The second stage of the process is one of IF document filtering 22 and this process may be performed either in an untrusted environment or a trusted environment. In this embodiment, it is performed in an untrusted environment. The ability to provide a trusted filter will largely depend upon the ease with which the software performing the filtering process can be verified to the requisite level of trust. This filtering produces an intermediate format IF' 24 by performing one or more operations which allow passage through the virtual filter of only certain classes of data. Carefully chosen classes of data and accurate performance of this process eliminates or corrupts the content of any covert information which may have been secreted into the document 14. A plurality of predetermined filters may be applied during this stage of the process.

It should be noted that by definition, any filter process should not introduce any new information and ideally should preserve the intended information content of the document which entered it.

Examples of filtering operations include: removing font information, converting all text to upper case and collapsing file documents into a single file. Bit map images in particular can carry large amounts of covert information within them, but this can be controlled by filtering the image in such a way that any information within them which is not visible to a human when the image is displayed is removed. While this would be done digitally, the effect is the same as if the image were printed and then re-scanned, at least one of the these processes operating as no higher resolution that a human eye. This effectively removes information hidden in non-visible bit planes, that are stored in low-order bits of pixel values and an micro-dot type covert information as well as seriously degrading channels based on things like very small colour differences. If the whole document is converted into a bit-map image (or sequence of them) and then processed in this way, this can be seen to offer security at least as effective as current paper-based practices, where printed copies of electronic documents are manually examined and classified before being appropriately distributed. A variation of this technique would be to compress and then decompress the image using a "lossy" compression scheme (i.e., one which may not recover the exact data from the original image on decompression, but will result in an image which is visually very close to the original).

Sometimes a necessary consequence of this type of document manipulation is creating a document with less information than was present in the original document. The degree of loss can be extreme and may result from applying such severe filter operations that the original message clarity may suffer (particularly so for images and pixel orientated data). However, as the number and sophistication of the filters applied increase, the probability of there being covert information still secreted in the document decreases.

The number and type of operations to be applied to the IF by process 22 may be determined by the user/author at the time and/or predetermined by the security officer/system administrator responsible for the network within which the document is created.

A physical mechanism for adjusting this variable may be in the form of a programmable preset adjusted by the operator before the conversion of documents by the program to an intermediate form IF'. Of course, in the untrusted environment, this may be a questionable procedure. However, in the trusted environment, the preset is likely to be a physically hardwired switch setting associated with the source trusted path device or, alternatively, a trusted software module, wherein a preset combination of filters in either of these devices automatically determines the variability of the filter operations to be performed. Furthermore, the number and type of filters that are applied may be manually determined or automatically applied dependant on the security level of the document to which to filter is applied.

One of the simplest possible filters would comprise a document content filter which operated to the rule that any complex document cannot pass the filter for sealing if it is classified. However, this approach defeats the purpose of the invention.

At another extreme, it is possible to apply a filter which removes all elements from the intermediate form IF', except those satisfying extremely limited criteria. This approach, however, may result in a document which does not adequately reflect the original document, thus making it useless to its intended recipient.

Furthermore, there may exist, by way of a preset means, a minimum set of filter processes which are performed 22 on the IF, this preset being controlled only by the security officer and/or the system administrator.

In practical terms, therefore, the filtering process aims to decrease the probability of covert information passing through the filter, while maintaining the intended information content of the document at a level acceptable to the user or author of the complex document.

Having performed the filtering processes to produce IF' either in an untrusted or trusted environment or even a combination of the two, IF' is sent 26 to a trusted environment 28 within which are performed one or more steps comprising at least the step of displaying the document in the most appropriate manner.

It is a preferable process in the procedure of handling complex documents to display the document in a way which will make certain types of covert information visible. Typically, covert information associated with image data is concealed when it is overwritten by legitimate pixel information. Therefore, to ensure that what is seen is what is sent the IF document is displayed 30 so that no pixel is written to the monitor more than once.

This display process is conducted within the trusted environment 28, and requires the operator/author to view 32 the document (e.g. page by page, or portions of the page as determined by the process itself) and thereby verify to the best of their perception that:

(a) the document contains the same information as the original created;

(b) the document, and in particular the images, are the same in terms of visual intent; and (c) there is no discernable covert information contained in the document.

The last mentioned responsibility of the operator/author is not necessarily always achievable. However, the execution of the "no overwrite" rule is a highly preferable process which ensures that if present, covert information will be displayed, if not always recognised. The "no overwrite" rule is applied when the environment in which the method is used demands this level of covert information checking.

Appropriate action to be taken if covert information is detected, may include not sealing the document, sending the document back to its author or diverting it to the network security officer.

Assuming there are no such problems, the operator/author then seals the document 34. The sealed document 35 (IF' plus seal) may then be transmitted 36 within the secure environment on its resident network to a gateway 37 which itself is a trusted device. Only a sealed document may pass the gateway which will as a matter of course check the seal to ensure the document passing out of the network is legitimately associated with that seal.

The seal will then typically be removed by the gateway, however, in certain circumstances there exists information within the seal which is required by the recipient of the document, so seal may continue to be associated with the document and the gateway will not then disassociate or remove the seal from the document. The type of information within the seal may include a document security classification indicator or other predetermined information.

There may also be processes of encryption applied to the IF' and sealed document 34 which will necessitate reciprocal decryption processes at the document's destination.

The document is delivered, via the external communication system 38, to the destination complex handling area 40, in its intermediate format IF' 44 with or without an associated seal and, if necessary after disassociation of the seal by process 42, will leave an IF' document 46. The document 10' is then reconstructed by reversing the effects of the transformation of 16 by process 52. This process is typically, but not necessarily, taking place in an untrusted environment using untrusted software.

Document 10' is preferably as similar as possible or ideally the same as the original document 10, while containing as little of the covertly introduced information 12 as possible.

Figure 2:
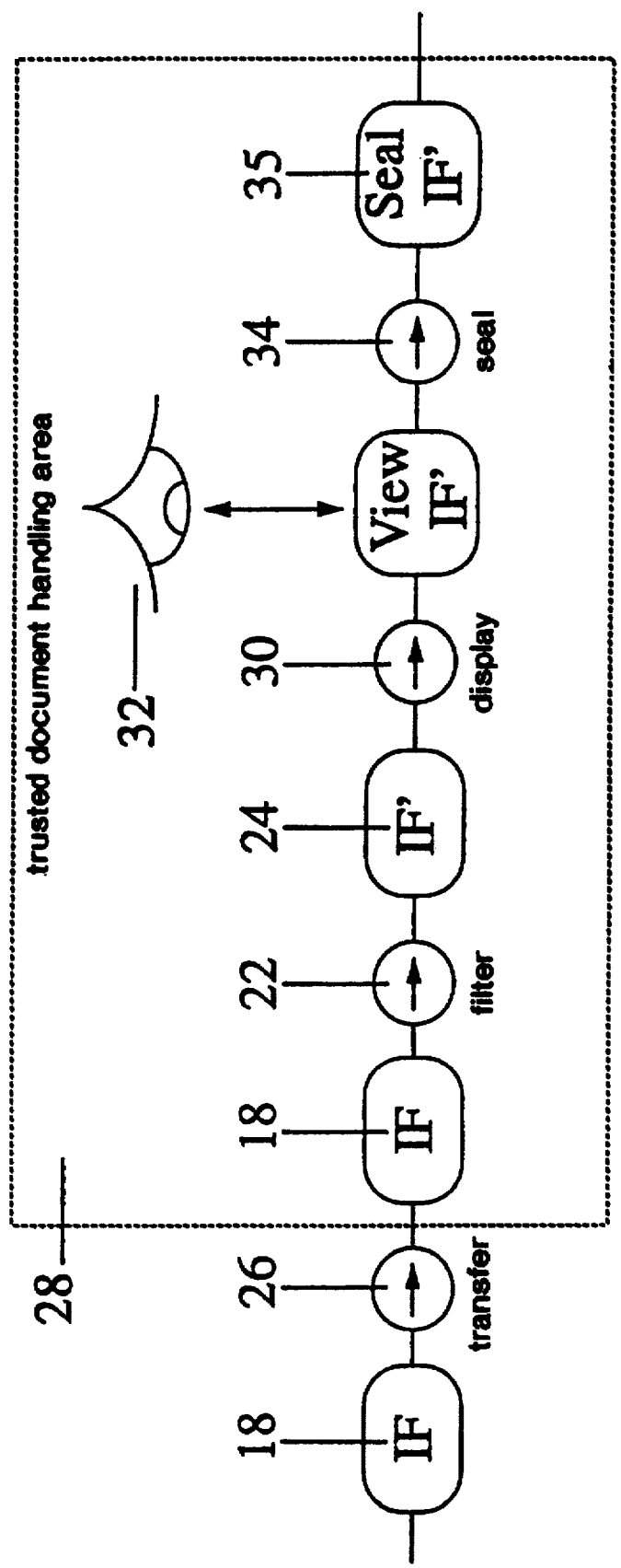
FIG. 2 depicts a schematic of the processes a document filtered in a trusted environment.

FIG. 2 shows a further variation of the process described thus far in relation to the operations performed within the trusted environment 28. In this variation the first step in the document handling process is to invoke a process 16 which transforms the complex document into an intermediate form (IF) 18 as shown in FIG. 1.

In this variation, process 16 is performed with untrusted software running on the untrusted computer which created the complex document which is then sent 26 to a trusted environment 28 within which is performed further steps, the first being the step of filtering 22. The ability to provide a trusted filter will largely depend upon the ease with which the software performing the filtering process can be verified to the requisite level of trust. This filtering process 22 produces an intermediate format IF' 24 by performing one or more operations which allow passage through the virtual filter of only certain classes of data. Carefully chosen classes of data and accurate performance of this process eliminates or corrupts the content of any covert information which may have been secreted into the document 14.

A plurality of predetermined filters may be applied during this stage of the process the number and type being determined as discussed previously.

Figure 3:
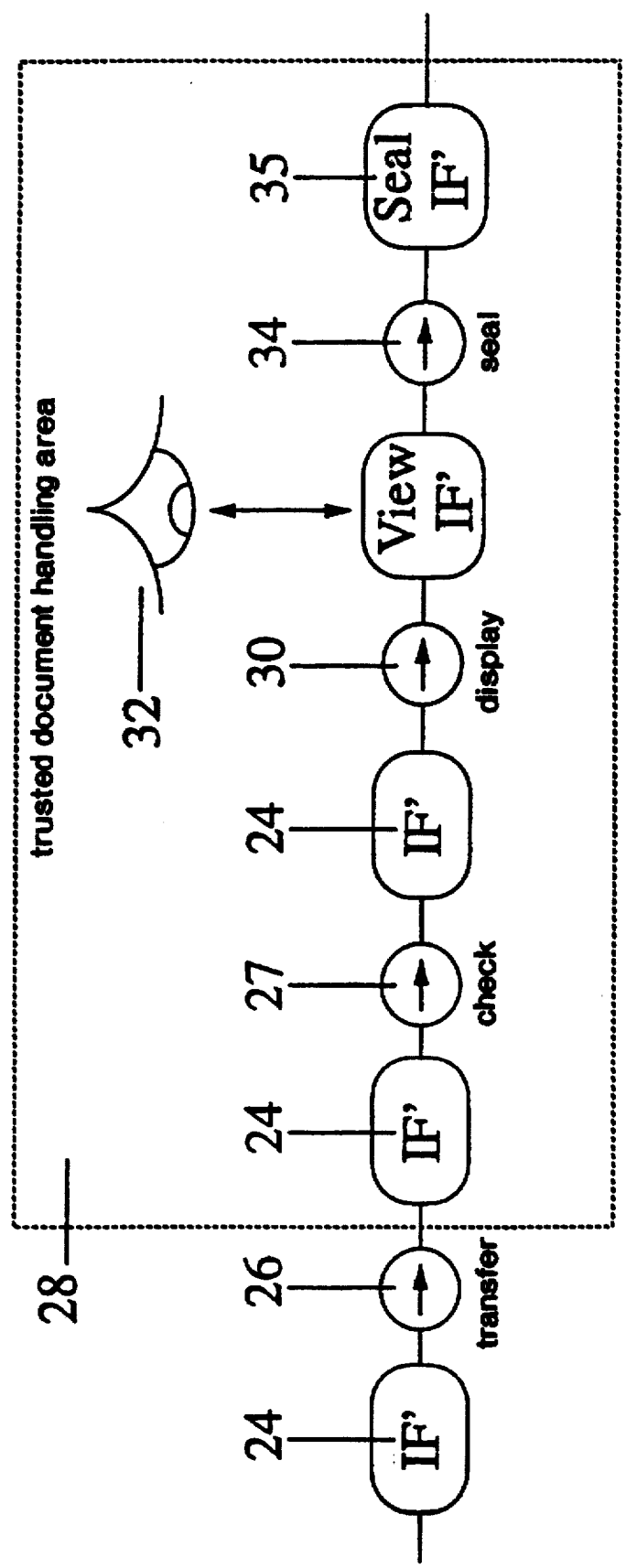
FIG. 3 depicts a schematic of the processes a document which is filtered in an untrusted environment and checked for correct filtering in a trusted environment.

FIG. 3 depicts a variation of the process described thus far in relation to the operations performed within the trusted environment 28. In this variation, having previously performed the filtering processes to produce IF 24 in an untrusted environment, IF is sent 26 to a trusted environment 28 within which are performed further steps, first the step being that of checking 27 the results of the filtering process 22 to ensure they have been performed as expected.

For example the filter process may be arranged to convert all lower case letters in a document to upper case therefore it would be part of the checking process to ensure that there were no lower case letters in the document. A checking process is more simply implemented in a trusted environment than a filtering process, particularly more so when only a predetermined subset of the intermediate form is allowed to proceed to the next stage of the process.

Referring again to FIG. 1, the process of reconstruction of document ID into document 10' relies on the reverse translation of the filtered IF document into the external document format. Since the effects of the filtering process 22 cannot be reversed at the receiving end, the received document 10' may not be identical with the original document 10. However, there will be, as a consequence of the method and means of the invention little likelihood that document 10' contains covert information having a source located within the secure environment in which the document was created.

We claim:

1. A method of handling a document for transmission external of a secure computer environment, comprising the steps of:
    (a) applying a document to at least one filter to eliminate or corrupt the content or form of covert information contained within said document;
    (b) displaying to a viewer said filtered document or a predetermined portion thereof in a trusted manner; and
    (c) communicating said filtered document in a secure manner, external of said secure computer environment, if said filtered and displayed document appears to be acceptable to said viewer.

2. A method of handling a document in accordance with claim 1 where step (c) further comprises:
    associating with said filtered document a seal which indicates that said document can be communicated external of said secure computer environment.

3. A method of handling a document in accordance with claim 1, where step (b) further comprises:
    displaying said filtered document or a predetermined portion thereof in a trusted manner so that no pixel of the display is written to more than once for the current portion of the document being displayed.

4. A method in accordance with claim 2, where step (b) further comprises displaying said filtered document or a predetermined portion thereof in a trusted manner so that no pixel of the display is written to more than once for the current portion of the document being displayed.

5. A method of handling a document in accordance with claim 1 with the following step being performed before step (b):
    (d) checking said filtered document in a trusted manner to ensure only a predetermined form of said document is passed to the next step.

6. A method of handling a document in accordance with claim 2 with the following step being performed before step (b):
    (e) checking said filtered document in a trusted manner to ensure only a predetermined form of said document is passed to the next step.

7. A method of handling a document in accordance with claim 3, with the following step being performed before step (b):
    (f) checking said filtered document in a trusted manner to ensure only a predetermined form of said document is passed to the next step.

8. A method of handling a document in accordance with claim 4, with the following step being performed before step (b):
    (g) checking said filtered document in a trusted manner to ensure only a predetermined form of said document is passed to the next step.

9. A method of handling a document in accordance with claim 1 where in step (a) at least one of said filters is trusted and adapted to eliminate or corrupt the content and form of covert information contained within said document.

10. A method of handling a document in accordance with claim 2 where in step (a) at least one of said filters is trusted and adapted to eliminate or corrupt the content and form of covert information contained within said document.

11. A method of handling a document in accordance with claim 3 where in step (a) at least one of said filters is trusted and adapted to eliminate or corrupt the content and form of covert information contained within said document.

12. A method of handling a document in accordance with claim 4 where in step (a) at least one of said filters is trusted and adapted to eliminate or corrupt the content and form of covert information contained within said document.

13. A method of handling a document for transmission external of a secure computer environment, comprising the steps of:
    (a) applying a document to at least one filter to eliminate or corrupt the content or form of covert information contained with said document;
    (b) displaying to a viewer said filtered document or a predetermined portion thereof in a trusted manner;
    (c) communicating said filtered document, in a secure manner, if said filtered and displayed document appears acceptable to said viewer, by associating with said filtered document a seal which indicates that said document can be communicated external of said secure computer environment;
    (d) receiving with a trusted gateway device located within said secure computer environment said document with its associated seal;
    (e) checking the validity of said seal with a trusted verification means, and if and only if said seal is validly associated with said document; and
    (f) communicating said document external of said secure computer environment.

14. A method according to claim 13, wherein step (f) further comprises communicating said document with its associated seal.

15. A method according to claim 14, and comprising the further steps of:
    g) receiving said document and its associated seal external of said secure computer environment; and
    h) disassociating said seal and extracting application specific data from said seal.

16. A method in accordance with any of claims 1–16 and 13–15, with the addition of the following step before any other step:
    (i) transforming said document into an intermediate form by defining the content and structure of said document using a predetermined set of document describers;
    and with all subsequent steps operating on the transformed document rather than said document.

17. A method in accordance with any of claims 1–15 and 13–15, with the following step being performed before any other step:

(j) transforming said document into an intermediate form by defining the content and structure of said document using a predetermined set of document describers;

and with the following additional step being performed after said transformed and filtered document is received external of said secure computer environment:

(k) further transforming said transformed and filtered document in the reverse fashion to step (j) to produce a final document in a form useful to the recipients of the document.

18. A method of handling a document for transmission external of a secure computer environment, comprising the steps of:

(a) applying a document to at least one filter to eliminate or corrupt the content or form of covert information contained within said document, wherein if not already a digital image, at least one of said filters converts said document or a portion thereof into a first digital image;

(b) converting said document or said first digital image into an analog form;

(c) converting said analog form into a second digital image, which comprises the filtered document or a portion thereof;

(d) displaying to a viewer said filtered document or a predetermined portion thereof in a trusted manner; and (e) communicating said filtered document in a secure manner, external of said secure computer environment, if said filtered and displayed document appears to be acceptable to said viewer.

19. A method in accordance with claim 18, wherein said second digital image is of equal or lesser resolution than said first digital image, said second digital image comprising the filtered document or a potion thereof.

20. A method in accordance with claim 18, wherein said at least one filter is a trusted filter.

21. A method in accordance with claim 20, wherein said second digital image is of equal or lesser resolution than said first digital image, said second digital image comprising the filtered document or a portion thereof.

22. A method of handling a document for transmission external of a secure computer environment, comprising the steps of:

(a) applying a document to at least one filter to eliminate or corrupt the content or form of covert information contained within said document, wherein if not already a digital image, at least one of said filters converts said document or a portion thereof into a first digital image;

(b) converting said document or said first digital image into a second digital image such that one or more pixel values from said first digital image is combined with itself or a predetermined value to produce one or more pixel values in said second digital image wherein said second digital image comprises said filtered document or a portion thereof;

(c) displaying to a viewer said filtered document or a predetermined portion thereof in a trusted manner; and (d) communicating said filtered document in a secure manner, external of said secure computer environment, if said filtered and displayed document appears to be acceptable to said viewer.

23. A method in accordance with claim 22, wherein said second digital image is of equal or lesser resolution such that one or more pixel values or portions of pixel values from said first digital image are selected and/or combined to produce one or more pixel values or portions of pixel values in said second digital image wherein said second digital image comprises said filtered document or a portion thereof.

24. A method in accordance with claim 22 or 23, wherein said one or more pixel values or portions of pixel values from said first digital image is selected and/or combined in a random or pseudo-random manner to produce one or more pixel values or portions of pixel values in said second digital image.

25. A method in accordance with claim 22, wherein said at least one filter is a trusted filter.

26. A method in accordance with claim 25, wherein said second digital image is of equal or lesser resolution such that one or more pixel values or portions of pixel values from said first digital image is selected and or combined to produce one or more pixel values or portions of pixel values in said second digital image wherein said second digital image comprises said filtered document or a portion thereof.

27. A method in accordance with claim 25 or 26, wherein said one or more pixel values or portions of pixel values from said first digital image is selected and or combined in a random or pseudo-random manner to produce one or more pixel values or portions of pixel values in said second digital image.

28. A method of a handling a document for transmission external of a secure computer environment, comprising the steps of:

(a) displaying said document or a predetermined portion thereof in a trusted manner;

(b) applying said document or a predetermined portion thereof to at least one filter to eliminate or corrupt the content or form of covert information contained within said document or portion thereof wherein at least one of said filters is trusted; and (c) communicating said filtered and displayed document in a secure manner external of said secure computer environment, if said displayed document appears acceptable to the viewer of the document.

29. The method of handling a document in accordance with claim 28, where step (c) further comprises:

associating with said filtered document a seal which indicates that said document can be communicated external of said secure computer environment.

30. The method of handling a document in according with claim 28, where step (a) further comprises:

displaying said filtered document or a predetermined portion thereof in a trusted manner so that no pixel of the display is written to more than once for the current portion of the document being displayed.

31. The method of handling a document in accordance with claim 24, where step (a) further comprises:

displaying said filtered document or a predetermined portion thereof in a trusted manner so that no pixel of the display is written to more than once for the current portion of the document being displayed.

* * * * *